Figure 1:
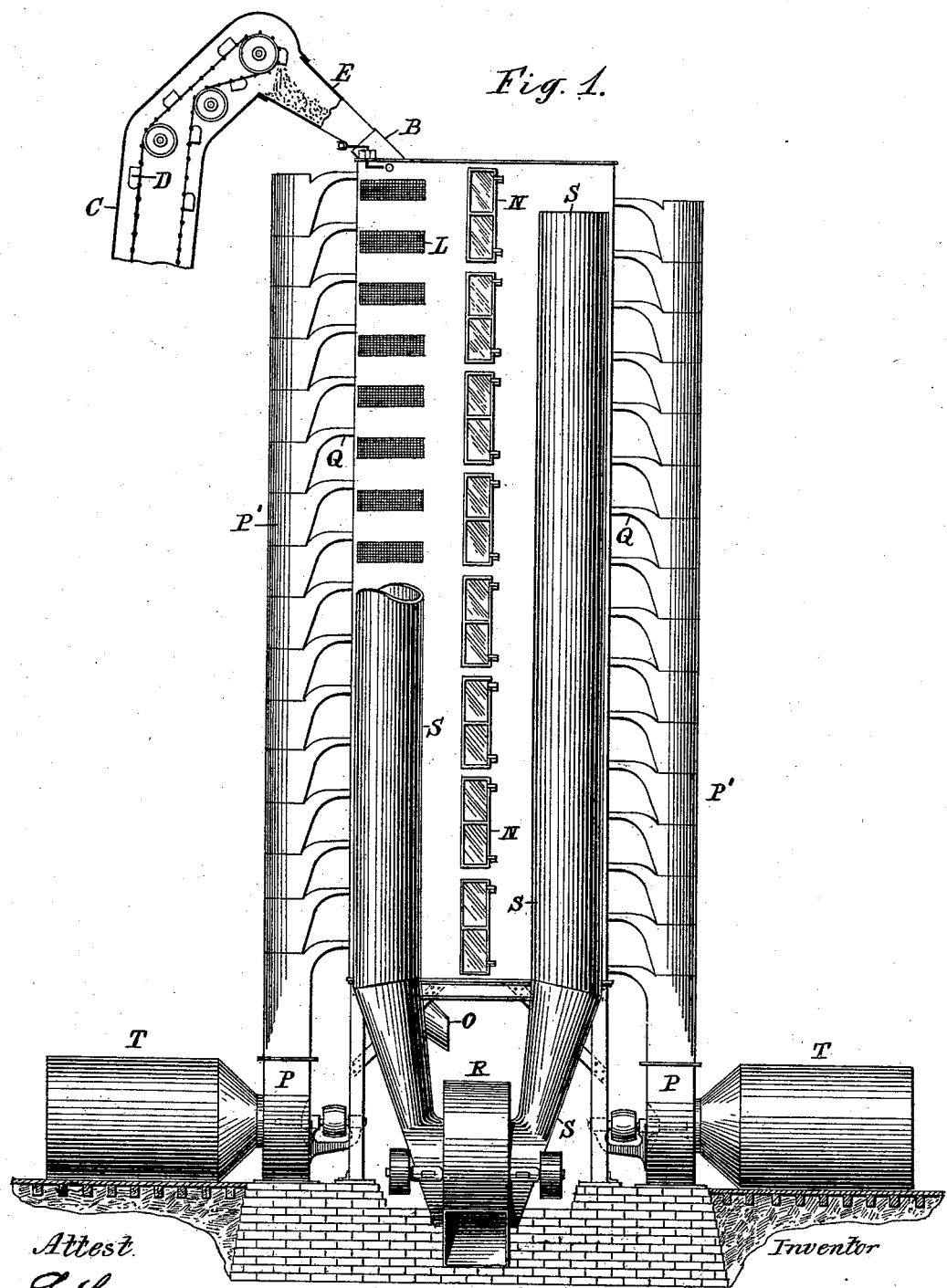

(No Model.) 4 Sheets—Sheet 2.
P. B. TAYLOR.
DRIER FOR BREWERS' GRAINS, &c.
No. 533,929. Patented Feb. 12, 1895.
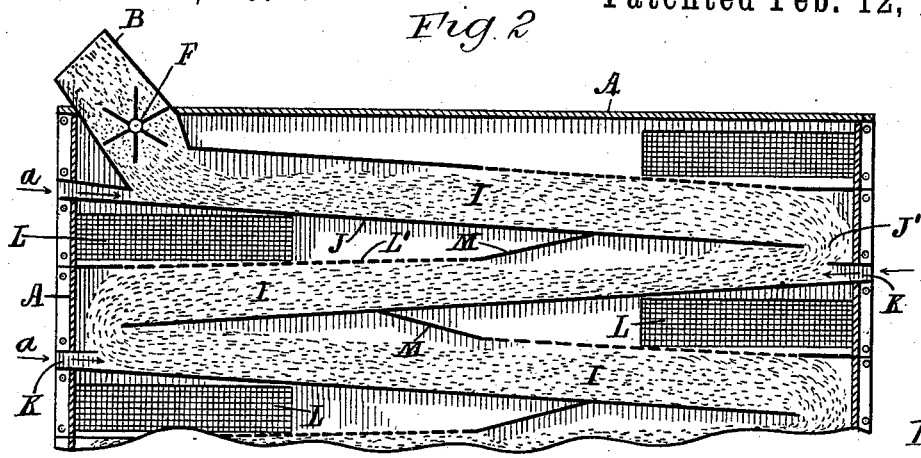
Fig. 2
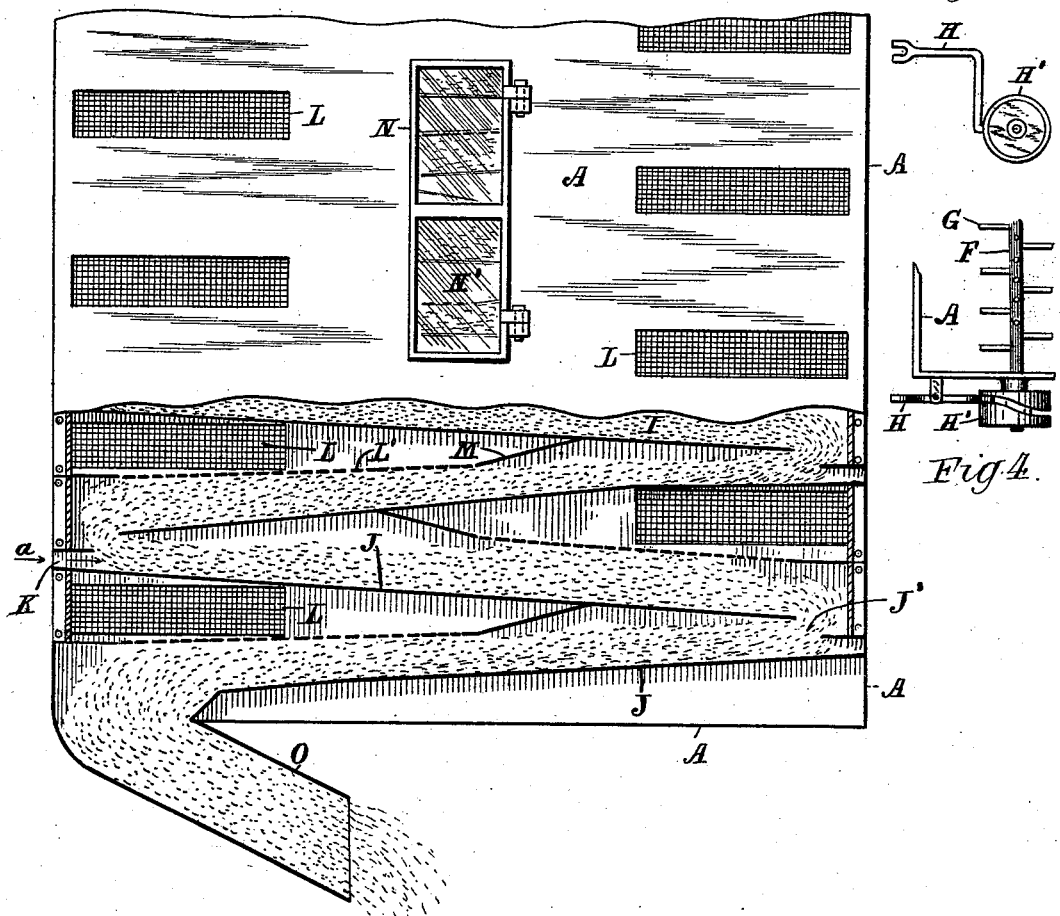
Fig. 3.
Fig. 4.
Attest.
L. Lee.
Edw. Hussey.
Inventor:
Percy B. Taylor, per
Thomas S. Crane, Atty.

(No Model.) 4 Sheets—Sheet 3.
P. B. TAYLOR.
DRIER FOR BREWERS' GRAINS, &c.

No. 533,929. Patented Feb. 12, 1895.

Attest:
L. Lee.
Edw. Kinsey.

Inventor.
Percy B. Taylor, per
Thomas S. Crane, Atty.

(No Model.) 4 Sheets—Sheet 4.
P. B. TAYLOR.
DRIER FOR BREWERS' GRAINS, &c.
No. 533,929. Patented Feb. 12, 1895.
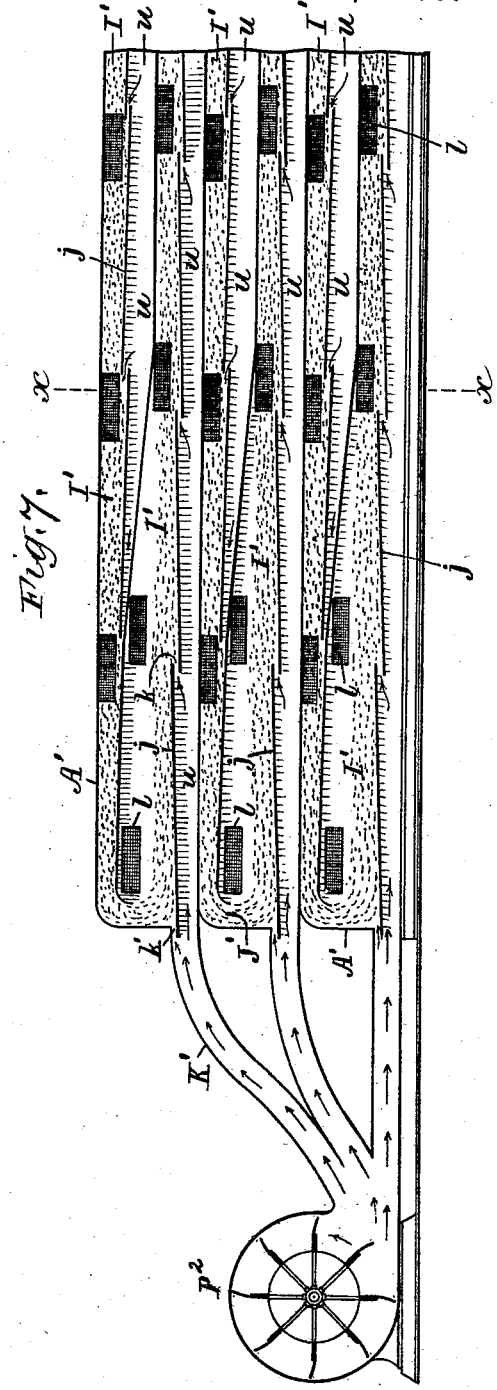
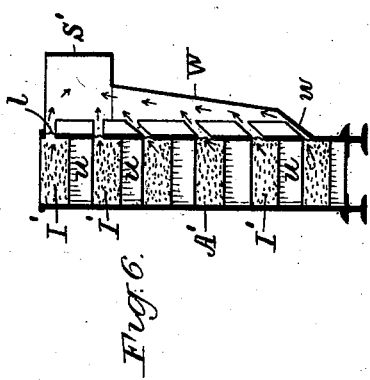
Attest
L. Lee.
Chr. Kusey
Inventor
Percy B. Taylor, per
Thomas S. Crane, Atty

UNITED STATES PATENT OFFICE.

PERCY B. TAYLOR, OF NEWARK, NEW JERSEY, ASSIGNOR OF ONE-HALF TO CYRUS C. CURRIER, OF SAME PLACE.

DRIER FOR BREWERS' GRAINS, &c.

SPECIFICATION forming part of Letters Patent No. 533,929, dated February 12, 1895.

Application filed February 21, 1894. Serial No. 501,001. (No model.)

*To all whom it may concern:*

Be it known that I, PERCY B. TAYLOR, a citizen of the United States, residing at Newark, Essex county, New Jersey, have invented certain new and useful Improvements in Driers for Brewers' Grains and other Materials, fully described and represented in the following specification and the accompanying drawings, forming a part of the same.

The object of the present invention is to utilize a current of air as a means of propelling the material through the drying apparatus, while the air also performs the function of absorbing and carrying away the moisture. To effect this object, I suspend the material in an air current during the drying operation, and at intervals during the process I draw off the moist air as it becomes charged with vapor to the desired degree. As the drawing off of the air diminishes its volume and pressure, I renew the pressure and velocity of air at intervals during the process, by forming a series of compartments within a suitable casing, and introducing a separate current of air at the inlet end of each compartment. The material is most easily transferred from one compartment to another, by arranging the compartments in a series superposed one above another; the material being transferred from the chambers in succession at alternate ends, and the air current being projected upon the material as it falls from one compartment to another. In such an arrangement, the floor of each chamber or compartment is preferably sloped at a slight angle toward its outlet, and the discharge passage for the moist air is formed over such outlet. The air is exhausted from such passage by a suction fan, and the reduction of pressure at such point is thus compensated by the fresh current of air projected upon the material as it enters the succeeding chamber.

In the drawings annexed, one apparatus is shown with a series of short chambers connected at opposite ends, and requiring a casing of greater height than length, and another apparatus is also shown of much greater length than height in which the air pressure is renewed at intervals by air jets admitted obliquely through the floor of each compartment.

Figure 5:
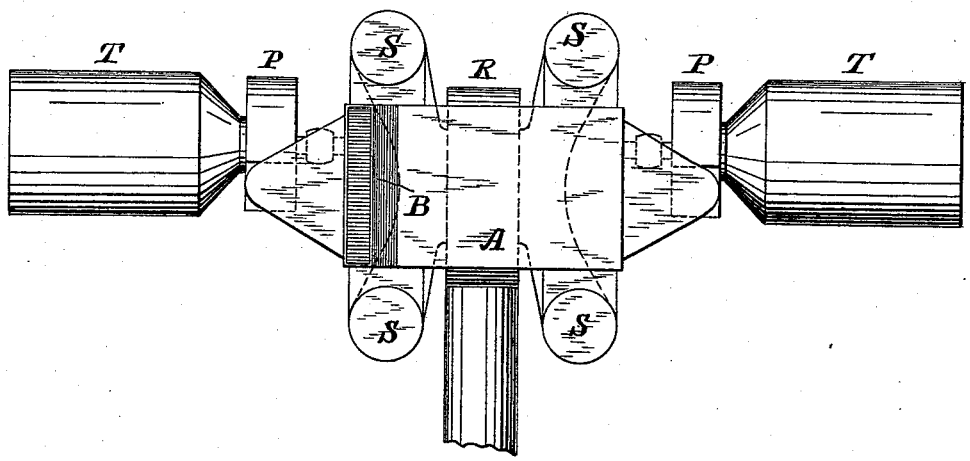

Figure 1 of the drawings shows an apparatus of the first description with a vertical casing and a blast apparatus, one of the suction pipes being broken away to exhibit the exhaust outlets and their screens, and the upper portion of an elevator being shown in connection with a hopper (partly in section) for delivering the material into the top of the apparatus. Fig. 2 is a diagram exhibiting the casing (upon a larger scale) broken transversely for want of room upon the drawings, and a part of the shell removed to show the internal construction. Fig. 3 is a side elevation, and Fig. 4 a plan of the cam for vibrating the hopper. Fig. 5 is a plan of the construction shown in Fig. 1 reduced one half, with the elevator and spout omitted. Fig. 6 is a transverse section of the apparatus shown in Fig. 7, the view being taken upon the section line $x, x$; and Fig. 7 is a side elevation in longitudinal section, of one end of an apparatus having long horizontal chambers or compartments with air admitted at intervals through openings in the floor.

Figs. 2 to 4 inclusive are drawn upon a scale three times as large as the remaining figures, and the blast and exhaust pipes are omitted from Fig. 2, the inlets and outlets only for the air being shown.

A designates the vertical casing; B, the feeding hopper at the top; C, a conveyer tube containing an elevator chain with buckets D. A vibrating spout E is pivoted to the top of the conveyer and its lower end fitted within the hopper B.

An agitator consisting of a shaft F with pins G is inserted in the hopper to loosen the material, and the spout E is vibrated by a lever H and a cam H' upon the shaft F.

The casing is divided into a series of superposed and substantially horizontal chambers I formed by floors J which extend from one end of the casing nearly to the other, leaving connecting openings J at alternate ends through which the material may fall upon the upper end of the succeeding floor. An air inlet K is provided in the end of the casing immediately beneath each of such connecting openings, and the material falls into the blast or jet entering by such inlet. Over the outlet J' in each chamber a suction passage L is provided forming an outlet for the moist air from each chamber.

Fig. 1 shows the means for supplying the air blast at the upper end of each floor, and for drawing the moist air from the suction passages.

P are fan blowers, shown one at each edge of the casing, and connected by a blast pipe P' and nozzles Q with the inlets a.

R is a suction fan having suction pipes S extended upward at the side of the casing, and such pipes are connected as shown in Fig. 7 with the suction passages L, a portion of which are exposed in Fig. 1.

The fans P are shown drawing the air through heaters T, and the fans may thus be supplied with heated air if required; but I have found that cold air suffices in many instances to properly dry the material where the material is suspended in the air current.

A netting is shown applied to the suction passages L to prevent the escape of material, and a deflector M is arranged above the floor to deflect the material away from the suction passage, and a perforated screen L' is extended over such deflector to the farther end of the chamber, between the suction passage L and the connecting opening J'.

The partitions or floors J direct the material in its course through the chambers; but the suction at the passages L would, if sufficiently powerful, tend to draw the material upward and prevent its free passage from one chamber to another downward through the connecting openings J'. The deflector M is applied at the upper side of each chamber to deflect the material away from such suction passage, and the screen L' operates still further to prevent the material from reaching such suction passage, and holds it in the path of the moving current.

A fine material, such as grain, is shown in the chamber I in Fig. 2, and its course through the chambers is clearly indicated by the dots and dashes representing such grain. A discharge spout O is shown at the bottom of the casing to lead the dried material from the lower end of the last chamber.

Such apparatus is especially adapted for drying beer grains, damaged wheat or corn, or similar materials, and may be used in the drying of other granular substances, if reduced to a suitable degree of fineness, and the material is then fed continuously into the hopper B and falls into the air jet from the first inlet K. Such air jet is indicated by the arrows a, and drives the material to the opposite end of the chamber I, where it falls through the outlet or connecting opening J' directly into the air jet at the upper end of the succeeding floor. The material is thus blown back and forth in the series of superposed chambers, while the moist air is exhausted at intervals through the suction passages L; which are arranged in each chamber at the end opposite that where the air jet enters.

In Fig. 2, a plate of metal is shown extended inward over the top of the air inlet K beneath the connecting opening J', to form an air guide, which directs the air jet lengthwise of the chamber, and operates to maintain the movement of the material continuously as it passes from one chamber to the other through the openings J'.

The floors are shown with an inclination not exceeding three degrees, and such slope is useful chiefly to prevent moist materials, like wet beer grains, from sticking to the floor in its forward movement.

The apparatus shown in Figs. 6 and 7 differs from that already described, in the means for introducing the series of air jets successively to the moving current of material. Such means consists of a succession of sloping apertures formed in the floor of the same chamber, and directed all of them toward the outlet of such chamber.

The apparatus shown in Fig. 7 would be provided with a blast fan P at each end, but the one at the left hand end only is shown for want of space upon the drawings. The opposite end of the apparatus would be similar to that shown in the figure, excepting that the blast pipes (lettered K' at the left hand end) from the opposite fan would be connected with the chambers a little higher, at the level of the air spaces u. The hopper would admit the material at the right hand end of the upper chamber, and the dried material would be discharged at the right hand end of the lower chamber I. In such a horizontal form of apparatus the series of superposed chambers I' is made of much greater length than with a vertical casing, and an air duct u is extended underneath each chamber, and the floor of the chamber is divided into a series of slightly inclined sections j with their adjacent ends separated sufficiently to form inlets k for admitting the air at regular intervals. The forward end of each floor section is projected a little over the inlet k to deflect the air horizontally over the succeeding floor section. A similar inlet k' is formed by extending the floor j a little way into the pipe k' from the blast fan. A suction passage l is shown in the side wall of the chamber above each of the inlets k. The pressure and velocity of the air current are thus renewed at intervals at the points where the moist air is withdrawn. The material entering the upper chamber is thus suspended in the air current during its movement through the entire series of chambers.

In Fig. 6, a suction pipe S' is shown extended along the side of the apparatus with a branch W running downward past each vertical series of suction passages, and connected by pipes w with the passages l.

The horizontal form of the apparatus may be used where it is impossible to elevate the material to a considerable height; but the vertical form of casing is preferable, as the grain moves gradually downward and is thus more readily sustained and propelled by the air current.

It will be noticed in Fig. 7 that the floor sections J are inclined slightly upward instead of downward, and as I have found such a construction to operate efficiently, it clearly shows that the air current is capable of propelling the material without the assistance of gravity. It will thus be seen that the partitions or floors operate chiefly as deflectors to direct the air current and the material back and forth within the apparatus in the desired direction.

It is obvious that this apparatus is not liable to get out of order, as it has no moving parts whatever within the casing. It is therefore simple to construct and easily operated, and when made in the horizontal form shown in Fig. 7, all the parts are readily accessible for inspection.

Having thus set forth the nature of the invention, what is claimed herein is—

1. In a drying apparatus, the combination, with a suitable casing, of a series of stationary superposed horizontal chambers with successive connecting openings at alternate ends, and a series of air jets introduced to the chambers at intervals and directed toward the outlets of such chambers and thus operating to impart a succession of impulses to the material moving through the chambers, substantially as set forth.

2. In a drying apparatus, the combination, with a suitable casing, of a series of stationary superposed horizontal chambers I or I' with successive connecting openings J' at alternate ends, an inlet B, with means for feeding the material into the supply end of the upper chamber, an air jet K or k' below the connecting opening J' forming the inlet to each chamber, and means above the connecting opening for exhausting the moist air from each of the chambers, substantially as herein set forth.

3. In a drying apparatus, the combination, with the vertical casing A, of the series of stationary superposed chambers with connecting openings J' at alternate ends, and suction passages L above such connecting openings, an outlet for material at the bottom of the casing, the blast pipes P' extended upward at the ends of the chambers with branches Q to the air inlets K, and suction pipes S extended upward at the sides of the casing, and connected with the suction passages L for drawing the moist air from the chambers, substantially as herein set forth.

4. In a drying apparatus, the combination, with the vertical casing A, of the series of stationary superposed chambers I with connecting openings J' at alternate ends, suction passages L above such connecting openings, perforated screens L' between the connecting openings J' and the suction passages L the blast pipes P' extended upward at the ends of the chambers with branches Q to the air inlets K, and suction pipes S extended upward at the sides of the casing, and connected with the suction passages L for drawing the moist air from the chambers, substantially as herein set forth.

5. A drying apparatus having a series of stationary superposed chambers I with successive connecting openings J' at alternate ends, each chamber having a floor J inclined slightly downward from the connecting opening, an air inlet K below such opening with air guide upon its upper side forming an air jet beneath such opening, the suction passage L above such opening provided with a netting as set forth, and the deflector M having the screen L' extended from the same between the suction passage and the connecting opening J', the whole arranged and operated as set forth.

6. In a drying apparatus, the combination, with a suitable casing, of a chamber having inlet and outlet for the material at opposite ends, and the floor of the chamber having inclined air passages at intervals therein, directed toward the outlet of the chamber, and adapted to impart a succession of impulses to the material, to move it from the inlet toward the outlet, substantially as herein set forth.

7. In a drying apparatus, the combination, with a suitable casing, of a series of stationary superposed horizontal chambers I' with successive connecting openings J' at alternate ends, and air jets k' below the connecting openings J' at the ends of the chambers, sloping passages k formed in the floors of the chambers at intervals, and directed toward the outlet of the chamber, and means for exhausting the moist air at intervals from the chambers, substantially as herein set forth.

In testimony whereof I have hereunto set my hand in the presence of two subscribing witnesses.

PERCY B. TAYLOR.

Witnesses:
FRANCIS C. FOSTER,
THOMAS S. CRANE.